United States Patent [19]

Kennedy et al.

[11] 4,241,406

[45] Dec. 23, 1980

[54] SYSTEM AND METHOD FOR ANALYZING OPERATION OF AN INK JET HEAD

[75] Inventors: Eugene T. Kennedy, Longmont; Donald L. Janeway, Broomfield, both of Colo.

[73] Assignee: International Business Machines Corporation, Armonk, N.Y.

[21] Appl. No.: 971,967

[22] Filed: Dec. 21, 1978

[51] Int. Cl.[3] .............................................. G01D 15/18

[52] U.S. Cl. ........................................ 364/518; 346/75

[58] Field of Search ............... 364/500, 518, 519, 523, 364/571; 346/140 R, 75

[56] References Cited

U.S. PATENT DOCUMENTS

| | | | |
|---|---|---|---|
| 3,787,882 | 1/1974 | Fillmore et al. | 346/75 |
| 3,796,630 | 10/1973 | Hill et al. | 346/75 |
| 3,828,172 | 8/1974 | Schickler | 364/500 |
| 3,831,727 | 8/1974 | Kruspe et al. | 346/140 X |
| 3,925,789 | 12/1975 | Kashio | 346/140 R X |
| 3,969,733 | 7/1976 | DeMoss et al. | 346/75 X |
| 4,085,408 | 4/1978 | Muto et al. | 346/75 |
| 4,097,873 | 6/1978 | Martin | 346/75 |
| 4,125,845 | 11/1978 | Stevenson, Jr. | 346/140 R |
| 4,131,899 | 12/1978 | Christou | 346/140 R |

*Primary Examiner*—Edward J. Wise
*Attorney, Agent, or Firm*—O'Rourke & Harris

[57] ABSTRACT

A system and method are disclosed for analyzing operation of an ink jet head. Initiation of start-up is sensed, as is the pressure build-up in the ink jet head as ink is supplied thereto. The time lapse between initiation of start-up and the commencement of pressure build-up is determined, as is the time required for the pressure within the ink jet head to build to an operational level, and outputs indicative thereof are utilized for determination of fault occurrence and indication of faults or initiation of fault correction in response thereto. The system includes a pair of counters controlled by start-up initiation and the outputs from a pair of comparators which receive predetermined reference signals and signals indicative of pressure build-up at the ink jet head, with the outputs from the counters being coupled to a microcomputer for determination of faults.

80 Claims, 5 Drawing Figures

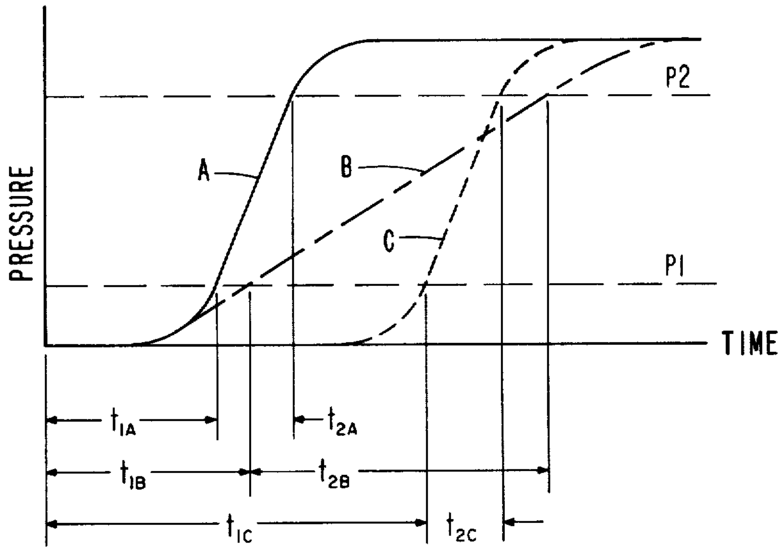

FIG. 4

| | |
|---|---|
| $t_1 < X_1$ | VALVE OUT OF TOLERANCE--ANTICIPATE VALVE FAILURE<br>(Valve out of adjustment)<br>(Valve actuation is too short) |
| $X_1 \leq t_1 < X_2$ | VALVE OK |
| $t_1 \geq X_2$ | VALVE OUT OF TOLERANCE--ANTICIPATE VALVE FAILURE<br>(Valve mechanism slow--possibly dirty)<br>(Electronic actuation weak)<br>(Solenoid weak) |
| $t_2 \geq X_3$ | RISE TIME TOO SLOW--HEAD ASSEMBLY WETTED BY JET START-UP<br>(Air in head)<br>(Pressure low) |
| $X_3 > t_2 \geq X_4$ | RISE TIME SLOW BUT LITTLE OR NO WETTING OF HEAD ASSEMBLY DURING START-UP--STREAM MAY BE HARD TO CONTROL<br>(Some air in head)<br>(Pressure low) |
| $t_2 < X_4$ | RISE TIME INDICATES GOOD PRINT OPERATION EXPECTED |

DIAGNOSTIC TABLE

FIG. 5

SYSTEM AND METHOD FOR ANALYZING OPERATION OF AN INK JET HEAD

This invention relates to an electronic monitoring system and method, and, more particularly, relates to a system and method for analyzing operation of an ink jet head.

BACKGROUND OF THE INVENTION

It is oftentimes desirable to maintain or analyze an apparatus to enable correct operation and/or to provide an indication of faults therein. Often, such an apparatus is self-correcting with the fault indications being automatically utilized by the apparatus to make the necessary corrections where possible.

Assurance of correct operation of the apparatus is particularly important in many instances, including assurance of correct operation of an ink jet head in a printing machine. In such a machine, a valve is commonly opened to allow ink from a pressurized source to pass to the ink jet head with a resulting pressure build-up in the ink jet head. The speed of operation of the valve and the time required for pressure build-up in the ink jet head indicates the general condition of the valve and ink jet head. If the operation of the valve is slow (or if the valve fails to open) and/or if the pressure build-up within the jet head is slow, this can indicate faulty operation and obviously can result in poor printing quality.

While the prior art shows various start-up procedures for an ink jet head (see, for example, U.S. Pat. Nos. 3,618,858 and 3,891,121), as well as control of ink concentration (see, for example, U.S. Pat. Nos. 3,771,568, 3,930,258 and 3,828,172), there is no known showing in the prior art of a system or method for automated dynamic diagnosis of an ink jet head or recovery from a fault therein.

SUMMARY OF THE INVENTION

This invention provides a system and method for analyzing operation of a device and determining faults therein, as well as initiating recovery procedures, where possible, when the presence of a fault is determined. In particular, this invention provides a system and method for analyzing operation of an ink jet head and determining faults therein due to valve actuation and/or pressure build-up, as well as initiating recovery procedures with respect thereto where possible.

It is therefore an object of this invention to provide an electronic system and method for monitoring operation of a device.

It is another object of this invention to provide an electronic system and method for initiating recovery procedures, where possible, if a fault is determined in a device.

It is yet another object of this invention to provide a system and method for analyzing operation of an ink jet head and utilizing the same to determine faults therein.

It is still another object of this invention to provide a system and method for analyzing operation of an ink jet head by determining the time lapse between initiation of start-up and pressure build-up to a predetermined level.

It is still another object of this invention to provide a system and method for analyzing operation of an ink jet head by determining the time lapse between initiation of start-up and pressure build-up to two different predetermined levels.

It is yet another object of this invention to provide a system and method for analyzing operation of an ink jet head by determining pressure characteristics in the ink jet head and utilizing the same to automatically initiate correction procedures if the pressure characteristics indicate a fault in operation of the ink jet head.

It is still another object of this invention to provide a system for analyzing operation of an ink jet head that includes counters, comparators and a microcomputer.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

FIG. 4 shows three examples of start-up pressure waveforms analyzed by this invention.

FIG. 5 is a diagnostic table.

DESCRIPTION OF THE PREFERRED EMBODIMENT

Figure 1:
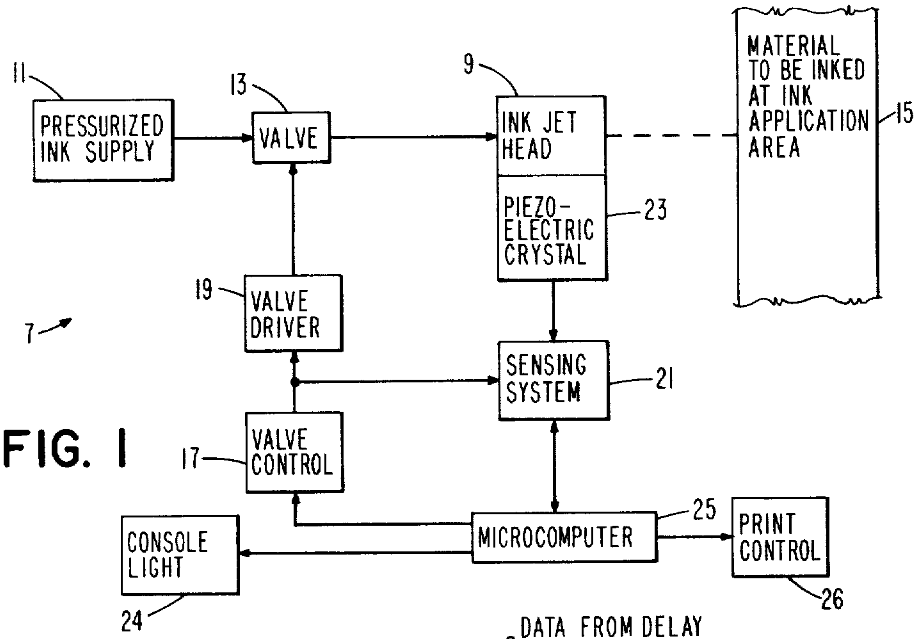
FIG. 1 is a block diagram of a printing device utilizing an ink jet head and having the analyzing system of this invention incorporated therein.

Referring to the drawings, FIG. 1 indicates, in block form, a printing device 7 having an ink jet head 9 incorporated therein. Printing devices incorporating an ink jet head are known in the prior art and this description is therefore limited to the portions thereof used in conjunction with the analyzing system and method of this invention.

As shown in FIG. 1, ink jet head 9 is connected with a pressurized ink supply 11 through valve 13. Although the ink supply is shown to be pressurized, a separate pressure source could be utilized, it being only necessary that a pressure build-up be caused to occur in the ink jet head, in the presence of ink therein, so that the ink is ejected from the ink jet head to material 15 (commonly paper) to be inked at an ink application area, as is common for printing devices utilizing ink jet heads.

Valve 13 is preferably an electro-magneticly actuated valve controlled by a valve control unit 17 through a valve driver 19. As is well known, such a valve may be opened by an energizing electrical output signal from the valve control unit applied through the driver (or amplifier) 19 to the valve unit. As indicated in FIG. 1, the electrical output signal from valve control unit 17 is also coupled to sensing system 21.

As also indicated in FIG. 1, ink jet head 9 has a pressure responsive transducer 23 to sense the pressure build-up within the ink jet head. Transducer 23 is preferably a piezoelectric crystal and is preferably the same crystal that is used to excite the ink jet head to break the ink stream into droplets.

The output from piezoelectric crystal 23 is an electrical signal that is proportional to the transient ink pressure against crystal 23 within the ink jet head. This signal is coupled to sensing system 21 of this invention.

At sensing system 21, the amount of time required for pressure to build-up to predetermined levels is determined and outputs indicative thereof are coupled to microcomputer 25 for analysis of operation of the ink jet head (along with the valve mechanism associated therewith).

The time between initiation of start-up (by providing an output signal from valve control unit 17) and the actual start of pressure build-up in the ink jet head indicates the general condition of the valve mechanism. If this initiation of start time is out of tolerance, microcomputer 25 turns on console light 24 to indicate that the valve mechanism should be checked.

By also determining the amount of time required for the pressure to build to an operational value, the general condition of the ink jet head may be determined, as can the likelihood of a clean start of the ink streams ejected from the ink jet head to the material to be inked. Depending on the pressure build-up or rise time, microcomputer 25 will actuate print control 26 to start a print operation, or to start a self recovery and clean-up procedure for the ink jet head. Print control 26, which is not a part of this invention, represents the functions necessary to print including control of relative motion between the ink jet head and the print material, data synchronization and deflection of ink droplets, and self-recovery operations for the ink jet head assembly 9.

Figure 2:
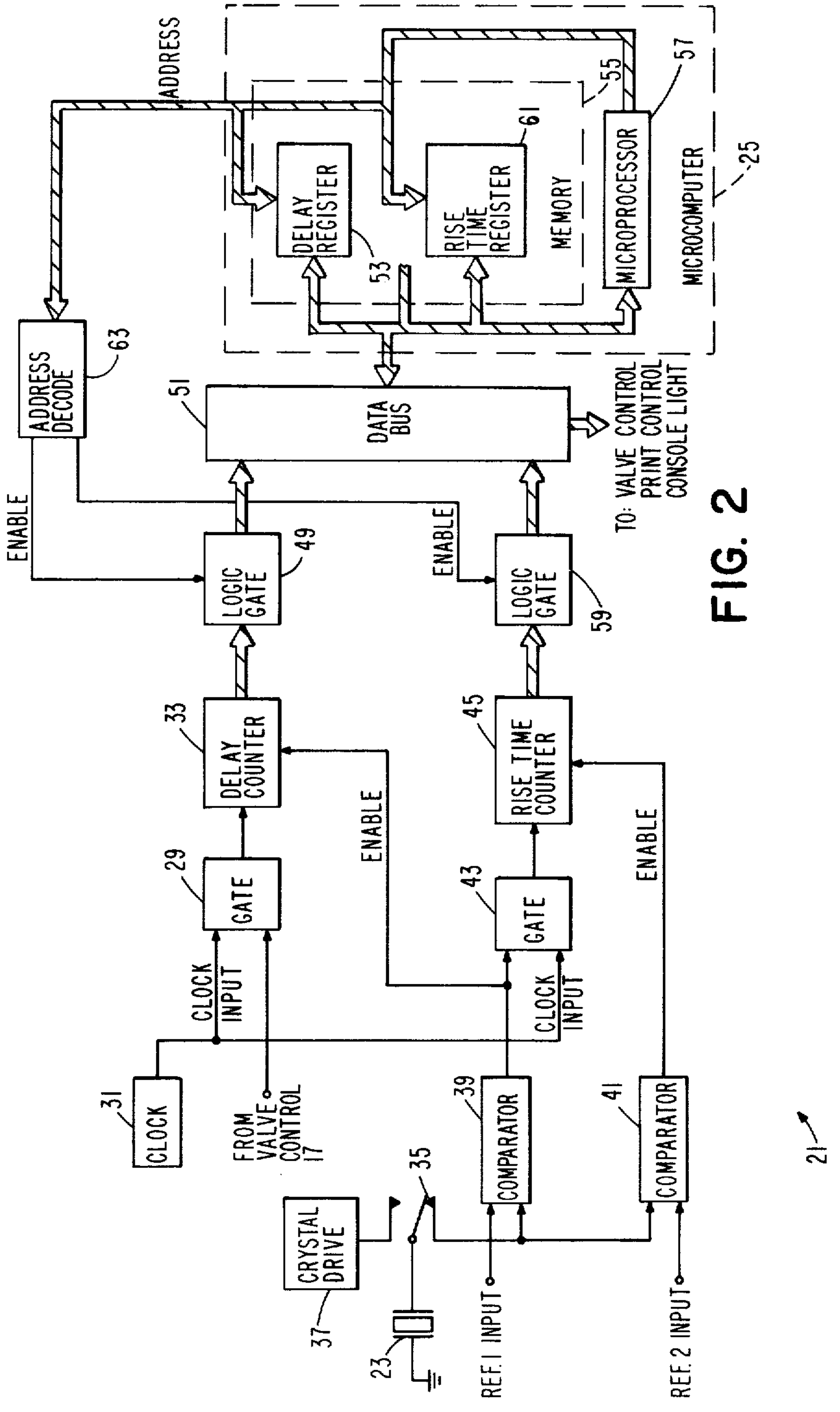
FIG. 2 is a block diagram illustrating the analyzing system of this invention.

FIG. 2 illustrates, in block form, an implementation of the sensing system 21 of this invention. As shown, gate 29 receives the electrical signal from valve control unit 17 as one input thereto. Gate 29 also receives a second input from clock 31 at any available clock frequency (for example, at a frequency of 16 MHz).

When a signal is coupled from valve control unit 17 to energize valve 13 to "open" the valve, the signal is also coupled to gate 29 to gate the clock signal therethrough. The output from gate 29 is connected to delay counter 33 and when an output is provided by gate 29, this causes delay counter 33 to start to count at a rate controlled by the frequency of the clock input to gate 29.

As ink passes through valve 13 to ink jet head 9, the pressure in the ink jet head begins to rise. The increase in pressure in the ink jet head causes deformation of piezoelectric crystal 23 and this produces a transient electrical output signal (which may be amplified) from the crystal that has a pulse height proportional to pressure. Crystal 23 has a frequency response sufficient to be sensitive to the pressure rise times to be sensed. Examples of rise times to be sensed are described hereinafter in reference to FIGS. 3, 4 and 5. Alternatively, a DC pressure transducer separate from piezoelectric crystal 23 might be placed in the ink jet cavity of head 9 to supply the pressure signals for the sensing system 21.

Since piezoelectric crystal 23 is preferably also the excitation crystal for drop generation in the ink jet head, crystal 23, as shown in FIG. 2, is connected to switch 35 for switching the crystal between the two different modes of operation (i.e., excitation of the crystal by means of crystal drive unit 37 and sensing of pressure build-up within the ink jet head) by an external mode control input signal controlling the switch.

When switch 35 is in the sensing mode (as indicated in FIG. 2), crystal 23 is connected with comparators 39 and 41 of the sensing system 21 to produce one input thereto. This input to the comparators indicates the amount of pressure build-up in the ink jet head.

Comparator 39 receives, as a second input, a reference signal, or voltage, just sufficient to indicate the start of rise of pressure within the ink jet head. When the pressure starts to rise in the ink jet head, the signal coupled to comparator 39 from piezoelectric crystal 23 increases. When the level exceeds the reference level, an output is provided at comparator 39, and this output is coupled to delay counter 33 to terminate the count thereat (the count having been started at initiation of start-up by the signal from valve control unit 17 enabling gate 29).

The output signal from comparator 39 is also coupled to gate 43 as one input thereto. Gate 43 receives, as a second input thereto, the clock signal from clock 31 so that when an output is received from comparator 39 (indicating the start of rise of pressure within the ink jet head), the clock signal is gated through gate 43 to rise time counter 45 to cause counter 45 to start to count at a rate determined by the frequency of the clock.

Piezoelectric crystal 23 is also connected to comparator 41 to couple an input thereto indicative of the pressure within the ink jet head. Comparator 41 also receives, as a second input, a second reference level signal, or voltage. This second reference level is greater than the first level coupled to comparator 39 and is selected to be indicative of a level within the ink jet head of almost the supply, or operational, level. When the pressure level within the ink jet head exceeds the second reference level, an output is produced by comparator 41, and this output is coupled to rise time counter 45 to terminate the count thereat.

As also shown in FIG. 2, the count on delay counter 33 is coupled through logic gate 49 and data bus 51 to delay register 53 of memory 55 in microcomputer 25, which microcomputer also includes a microprocessor 57. This count is stored in delay register 53 and then used to calculate the time delay, or lapse, between switching of valve control unit 17 and the start of pressure rise in the ink jet head.

In like manner, the count on rise time counter 45 is coupled through logic gate 59 and data bus 51 to rise time register 61 in memory 55 of microcomputer 25. This count represents the rate of pulse rise, i.e., rise time of pressure within the ink jet head.

As shown in FIG. 2, the transfer of the counts from counters 33 and 45 is controlled by address decode unit 63. When microprocessor 57 generates the address for delay register 53, address decode unit 63 generates an enable signal for logic gate 49. When microprocessor 57 generates the address for rise time register 61, address decode unit 63 generates an enable signal for logic gate 59. Gates 49 and 59 transfer the delay count and rise time count to registers 53 and 61, respectively, when enabled.

After transfer of the count on counters 33 and 45 to the memory registers of microcomputer 25, the necessary calculations, decisions and records are made utilizing this data. The count data can be used, for example, to update statistics in the microprocessor diagnostic logs concerning frequency of valve starts exhibiting similar counts to thereby generate a frequency distribution of start speeds. The data, used in conjunction with microprocessor generated statistics on the trend of machine valves, can also indicate impending head-valve failures and is therefore useful in machine maintenance.

Figure 3:
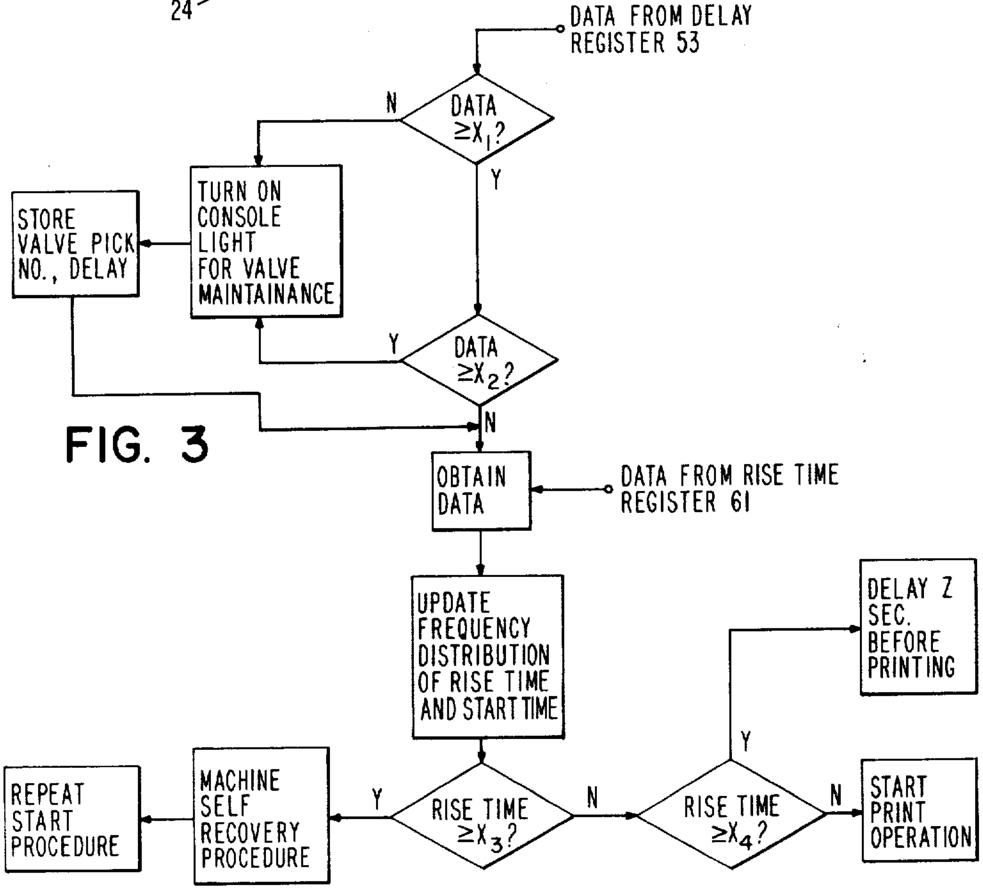
FIG. 3 is a flow diagram illustrating operation of the microprocessor shown in FIG. 2.

FIG. 3 is a flow diagram illustrating operation of microprocessor 57. As shown, it is first determined if the data from delay register 53 is equal to or greater than a value $X_1$ (which is the characteristic valve pick time lower limit and may be, for example, 3 ms). If not, an output is produced to energize an indication (such as console light 24-FIG. 1) to indicate a need for valve maintenance. At the same time, the valve pick number and delay can be stored in the memory 55.

If the data for delay register 53 is greater than the value $X_1$, and is also greater than, or equal to, the value $X_2$ (which is the characteristic valve pick time upper limit and may be, for example, 5 ms), then the indication (i.e., light 24) is energized to indicate the need for valve maintenance in the same manner as if the value was less than the value $X_1$.

If the data for register 53 is greater than, or equal to, the value $X_1$, but is less than the value $X_2$, then the data is obtained from time rise register 61. Also, if valve maintenance has been indicated, the microprocessor still obtains the rise time data. If the rise time is within limits, the printing operation can proceed even though the valve operation is out of tolerance.

The frequency distribution of the rise time is next updated. If the rise time is greater than, or equal to, a value $X_3$ (which is the rise time upper limit and may be, for example, 5 ms), then the machine is instructed to initiate a self-recovery procedure, after which the start procedure is automatically repeated.

If the rise time is less than the value $X_3$, and is less than a value $X_4$ (for example, 2 ms), then the machine is instructed to supply ink to the material and thus to start the print operation.

If the rise time should be greater than, or equal to, the value $X_4$, and less than the value $X_3$ (indicating that there is some air in the head), the machine is delayed by a value Z (which is the delay time required to dissolve unwanted air from the ink in the ink jet head), after which the machine starts to print.

Referring now to FIG. 4, three examples of the rising edge of the pulse from crystal 23 are shown. The start times $t_1$ and the rise times $t_2$ are identified for each wave form by the subscripts A, B, and C for waveforms A, B, and C, respectively. Waveform A represents a normal start-up where the valve operated within tolerances and the pressure rise time $t_{2A}$ indicates a proper start-up of the ink jet.

Waveform B is an example where valve actuation was within tolerance but the pressure build-up is too slow. The likely result of the slow pressure build-up is that ink is sprayed onto the other components in the ink jet head assembly. It is very likely that a successful print operation could not occur and therefore, a recovery procedure would be initiated.

Waveform C is an example where the start time indicates that valve actuation is out of tolerance, however, once started the pressure rise time build-up is normal. In this situation, a normal print operation could be expected but the valve would be marked for maintenance in anticipation of a future failure.

The diagnostic table in FIG. 5 shows the criteria for selecting the values $X_1$, $X_2$, $X_3$, and $X_4$ used by the microprocessor 57 as described in the flow diagram of FIG. 3.

When the start time is less than $X_1$, or greater than or equal to $X_2$, the valve is out of tolerance and a failure of the valve in the future can be expected. A rise time of less than $X_1$ might be caused by the valve being out of adjustment or the valve actuation being too short in its stroke in turning ink flow on and off.

The start time being greater than or equal to $X_2$ can be an indication that the valve mechanism is slow, possibly because it is dirty. It can also indicate that the electronic drive for the valve solenoid is weak or possibly the solenoid itself is weak. Waveform C in FIG. 4 is an example of the start time being greater than $X_2$.

The rise time $t_2$ being greater than or equal to $X_3$ is an indication that the pressure build-up was too slow. In this situation, it is highly probable that the ink jet head assembly will be wetted by the ink jet. This might be caused by excessive air in the ink cavity of the head or by a failure in the pressure system pressurizing the ink. Waveform B in FIG. 4 is an example of a rise time greater than $X_3$. The rise time being greater or equal to $X_4$, but less than $X_3$ is an indication that the ink pressure build-up in the head was slow but probably not so slow as to cause a wetting of the head assembly during start-up. This may indicate that the ink jet stream would be hard to control but a printing operation can likely proceed successfully. One probable cause for the slower than normal rise time is air in the head. By allowing a period of delay before the print operation begins this air can usually be removed by being dissolved into the ink. Of course another source for the slow rise time might be a low ink pressure. In this case the ink stream may be hard to control.

If the rise time $t_2$ is less than $X_4$ the pressure build-up in the head is normal and a good printing operation can be expected. Waveforms A and C are examples of proper rise times.

While some start times and rise times have been earlier given as examples, it will be appreciated by one skilled in the art that an acceptable rise time and an acceptable start time will depend on the ink jet printing system. Values of $X_1$, $X_2$, $X_3$, and $X_4$ may be selected and easily changed by reprogramming the microprocessor. The values used will depend upon the ink jet assembly which the invention system is monitoring.

Thus, a high count on register 53 can be used to indicate the need for valve maintenance, while a high count on register 61 can leave the machine in a "not ready" mode to dissolve entrapped air and thus insure proper drop generating action. The value of the high counts can also be used to initiate discreet levels of machine self-recovery, such as air purging of the head, valve starting re-tries, or deflection electrode cleaning.

While not specifically shown, it is also to be appreciated that the system and method could also be utilized to time the speed of pressure decay in the ink jet head at valve shut-off in the same manner as described hereinabove with respect to start-up. Such information can, of course, also be utilized to determine proper operation of the ink jet head and associated valve mechanisms.

As can be appreciated from the foregoing, this invention provides a system and method for automated dynamic analysis of a device such as an ink jet head and can, by way of example, detect a sticking valve, air ingestion during valve cycling, incomplete air purging after head replacement, and/or air leaks in the ink system.

While we have illustrated and described the preferred embodiment of our invention, it is to be understood that we do not limit ourselves to the precise constructions herein disclosed and the right is reserved to all changes and modifications coming within the scope of the invention as defined in the appended claims.

What is claimed is:

1. A system for analyzing operation of an ink jet head from which ink is ejected due to pressure within said head, said system comprising:

sensing means for sensing the pressure characteristic in the ink jet head during a predetermined pressure change period; and determining means connected with said sensing means for determining pressure build-up within said ink jet head to thereby detect faults in performance of said ink jet head based upon said pressure characteristics sensed by said sensing means.

2. The system of claim 1 wherein said sensing means includes a pressure responsive transducer at said ink jet head for sensing the pressure thereat and providing an electrical output signal proportional thereto.

3. The system of claim 2 wherein said pressure responsive transducer is a piezoelectric crystal.

4. The system of claim 1 wherein said determining means includes time determining means for determining the amount of time necessary for pressure in said ink jet head to build to a predetermined pressure level during start-up.

5. The system of claim 4 wherein said time determining means includes a counter actuated at the initiation of start-up and a comparator for stopping the count on said counter when said pressure in said ink jet head reaches said predetermined pressure level.

6. The system of claim 5 wherein said counter is connected with a gate receiving a clock input and an indication of initiation start-up whereby said counter counts at the frequency of said clock when said clock is actuated at initiation of start-up.

7. The system of claim 4 wherein said time determining means includes means for determining the amount of time necessary for pressure in said ink jet head to build to at least two different predetermined pressure levels during start-up.

8. The system of claim 7 wherein said time determining means includes first and second counters and first and second comparators connected with said sensing means, with said first counter being actuated to start counting at the initiation of start-up and connected to said first comparator to stop counting when the pressure in said ink jet head reaches a first of said predetermined different pressure levels, and with said second counter being connected with said first comparator to start counting when said pressure in said ink jet head reaches said first predetermined pressure level and connected with said second comparator to stop counting when said pressure in said ink jet head reaches the second of said predetermined different pressure levels.

9. The system of claim 8 wherein said first and second counters are connected with said first and second gates, respectively, both of which receive a clock input and with said first and second gates also receiving an indication of initiation of start-up and the output from the first comparator, respectively, whereby each counter is caused to count at the frequency of said clock until said count is terminated.

10. The system of claim 1 wherein said system includes means for causing initiation of a recovery procedure based on a fault determined by said determining means.

11. The system of claim 10 wherein said means for causing initiation of said recovery procedure includes a microcomputer.

12. The system of claim 11 wherein said microcomputer includes memory means for receiving indications of faults from said detecting means.

13. The system of claim 12 wherein said microcomputer includes a microprocessor.

14. The system of claim 13 wherein said system includes indicating means for indicating a need for valve maintainence, and wherein said microprocessor controls activation of said indicating means in response to an output from said memory means indicative of valve fault.

15. The system of claim 14 wherein said system includes storing means for storing valve pick number and delay, and wherein said microprocessor controls coupling of a signal to said storage means when said indicating means is actuated.

16. The system of claim 13 wherein said microprocessor updates the frequency distribution of start time in response to data from said memory means.

17. The system of claim 13 wherein said microprocessor updates the frequency distribution of rise time in response to data from said memory means.

18. The system of claim 13 wherein said microprocessor causes initiation of printing by said ink jet head when said memory means indicates that the rise time of pressure on said ink jet head is less than a predetermined value indicative of the maximum permissible rise time.

19. The system of claim 13 wherein said microprocessor causes initiation of printing by said ink jet head after a predetermined delay when said memory means indicates that the rise time of pressure on said ink jet head is less than a first predetermined value indicative of the maximum permissible rise time and is greater than, or equal to, a second predetermined value indicative of air in the ink in said ink jet head.

20. A system for analyzing operation of an ink jet head, said system comprising:

a piezoelectric crystal for sensing the pressure at an ink jet head and providing an electrical output signal proportional to the pressure sensed;

a first comparator for comparing the pressure sensed by said piezoelectric crystal and a first reference level, said first comparator providing an output when said pressure sensed by said piezoelectric crystal exceeds said first reference level;

a second comparator for comparing the pressure sensed by said piezoelectric crystal and a second reference level, said second comparator providing an output when said pressure sensed by said piezoelectric crystal exceeds said second reference level;

a first counter connected with said first comparator for counting from initiation of start-up until said first pressure level is exceeded at said ink jet head;

a second counter connected with said first and second comparators for counting from the time that said first pressure level is exceeded until said second reference level exceeds at said ink jet head; and a microcomputer connected with said first and second counters for initiating at least one of indication and correction when said count on said counters indicates a fault in operation of said ink jet head.

21. The system of claim 20 wherein said microcomputer includes a delay register and a rise time register for receiving and individually storing the counts on said counters.

22. The system of claim 21 wherein said registers are connected with said counters through logic gates.

23. The system of claim 21 wherein said microcomputer includes a microprocessor connected with said registers.

24. The system of claim 23 wherein said system includes light means for indicating a need for valve maintainence, and wherein said microprocessor controls energization of said light means in response to data from said delay register is indicative of valve fault.

25. The system of claim 24 wherein said system includes storing means for storing valve pick number and delay, and wherein said microprocessor controls coupling of a signal to said storage means when said light means is energized.

26. The system of claim 23 wherein said microprocessor updates the frequency distribution of start time in response to data from said rise time register.

27. The system of claim 23 wherein said microprocessor updates the frequency distribution of rise time in response to data from said rise time register.

28. The system of claim 23 wherein said microprocessor causes initiation of printing by said ink jet head when said rise time register indicates that the rise time of pressure in said ink jet head is less than a predetermined value indicative of the maximum permissible rise time.

29. The system of claim 23 wherein said microprocessor causes initiation of printing by said ink jet head after a predetermined delay when said rise time register indicates that the rise time of pressure in said ink jet head is less than a first predetermined value indicative of the maximum permissible rise time and is greater than, or equal to, a second predetermined value indicative of air in the ink in said ink jet head.

30. A system for analyzing operation of a device having a material flow initiating unit and a pressure drive for expelling material from said device, said system comprising:

sensing means connected with said material flow initiating unit for sensing initiation of material flow and providing an output indicative thereof;

transducer means for vibrating said flow during normal operation of said transducer means and also sensing pressure build-up in said device following initiation of material flow and providing an output indicative of said pressure build-up; and determining means connected with said sensing means and said transducer means to receive said outputs therefrom and responsive thereto determining the time lapse between initiation of material flow and pressure build-up.

31. The system of claim 30 wherein said sensing means produces electrical output signals indicative of initiation of material flow and pressure build-up, and wherein said determining means includes electrical means for receiving said outputs and determining therefrom said time lapse.

32. The system of claim 31 wherein said determining means includes counter means.

33. The system of claim 30 wherein said transducer means includes a piezoelectric crystal for providing an electrical output proportional to pressure sensed in said device.

34. The system of claim 30 wherein said determining means includes comparator means for comparing said indicated pressure with a reference pressure.

35. The system of claim 34 wherein said reference pressure is chosen so that initial build-up of pressure is effectively sensed.

36. The system of claim 34 wherein said reference pressure is chosen so that an operational pressure is effectively sensed.

37. The system of claim 34 wherein a plurality of reference pressures are utilized for comparison so that both initial build-up of pressure and achievement of an operational pressure are effectively sensed.

38. The system of claim 30 wherein said system includes utilization means for receiving said determined time lapse from said determining means and responsive thereto indicating faults in operation of said device.

39. The system of claim 38 wherein said utilization means includes a microcomputer.

40. The system of claim 30 wherein the material flow monitored is ink supplied to an ink jet head, wherein said material flow initiating device includes a valve connected with said ink jet head and controlled by a valve control unit, and wherein said sensing means is connected with said valve control unit to sense initiation of ink flow.

41. The system of claim 40 wherein said valve control unit includes electrical means providing an electrical output signal indicative of initiation of ink flow to said sensing means, wherein said transducer means is in said ink jet head and produces an electrical output signal indicative of pressure build-up in said ink jet head, and wherein said determining means includes counter means for receiving said electrical output signals and responsive thereto determining said time lapse.

42. A system for analyzing operation of an ink jet head receiving ink from an ink supply through a valve controlled by a valve control unit so that ink received at said ink jet head is ejected under pressure therefrom, said system comprising:

first sensing means for sensing actuation of said valve control unit to open said valve and providing an output indicative thereof;

second sensing means for sensing pressure build-up in said ink jet head and producing an output indicative thereof; and time lapse determining means for receiving said output from said first and second sensing means and responsive thereto producing an output indicative of the time lapse between said actuation of said valve and said pressure build-up in said ink jet head.

43. The system of claim 42 wherein said first sensing means senses actuation of said valve control unit and responsive thereto provides an electrical output signal, and wherein said second sensing means includes a pressure responsive transducer at said ink jet head, said transducer providing an electrical output signal proportional to pressure sensed in said ink jet head.

44. The system of claim 43 wherein said time lapse determining means includes counter means actuated under the control of said electrical output signal from said first and second sensing means to produce a count indicative of said time lapse.

45. The system of claim 44 wherein said time lapse determining means includes a gate connected to receive a clock input at a predetermined frequency and said electrical output signal from said first sensing means with said gate providing an output to said counter means for causing said counter means to count at said clock frequency, and a comparator for receiving a reference signal input at a predetermined level and said electrical signal output from said transducer with said comparator providing an output to said counter means to cause said count thereon to be terminated when said electrical signal output from said transducer exceeds said reference signal coupled to said comparator.

46. The system of claim 45 wherein said counter means of said time lapse determining means includes first and second counters with said gate and comparator being connected with said first counter, and wherein said time lapse determining means also includes a second gate connected to receive said clock input and output from said comparator with the output from said second gate being coupled to said second counter to cause said second counter to count said clock frequency, and a second comparator connected to receive a second reference input signal at a predetermined level different from that of said first predetermined level and the electrical output signal from said transducer with the output from said second comparator being coupled to said second counter to cause said count thereon to be terminated when said electrical output signal from said transducer exceeds said second reference signal coupled to said second comparator.

47. The system of claim 42 wherein said system includes utilization means connected with said time lapse determining means for controlling operation of said ink jet head.

48. The system of claim 42 wherein said utilization means includes a microcomputer.

49. The system of claim 48 wherein said microcomputer includes memory means connected with said time lapse determining means for storing said determined time lapse.

50. The system of claim 48 wherein said memory means is connected with said time lapse determining means through a data bus and a logic gate controlled by an address decode unit.

51. A system for analyzing operation of a material inking unit having ink flow from an ink supply to an ink jet head through a valve controlled by an electrical valve control unit with the ink being ejected under pressure from the ink jet head, said system comprising:

- a first gate connected to receive a clock input at a predetermined frequency and the electrical output signal from said electrical valve control unit indicative of initiation of inking in said inking unit, said first gate providing an output at said clock frequency upon receipt of said electrical output signal indicative of initiation of inking;
- a delay counter connected to said first gate to receive said output therefrom to cause said delay counter to count at said clock frequency;
- a piezoelectrical crystal at said ink jet head to sense the pressure thereat and providing an output signal indicative thereof;
- a first comparator connected to receive a reference input signal at a predetermined level and said output signal from said piezoelectric crystal, said first comparator providing an output to said delay counter to terminate the count thereat when said output signal from piezoelectric crystal exceeds the level of said first reference input signal;
- a second gate connected to receive said clock input and the output from said first comparator, said second gate providing an output at said clock frequency upon receipt of said output from said first comparator;
- a rise time counter connected to said second gate to receive said output therefrom to cause said rise time counter to count at said clock frequency;
- a second comparator connect to receive a reference input signal at a predetermined level greater than said first predetermined level and said output signal from said piezoelectric crystal, said second comparator providing an output to said rise time counter to terminate the count thereat when said output signal from said piezoelectric crystal exceeds the level of said second reference input signal;
- a microcomputer having a delay register and a rise time register;
- coupling means including first and second logic gates connected with said delay counter and said rise time counter, respectively, with said first and second gates being connected with said delay register and said rise time register, respectively, through a data bus; and
- address decode means connected with said microcomputer and said first and second gates for controlling passage of the counts on said counters to said registers of said microcomputer.

52. The system of claim 51 wherein said system includes crystal drive means and switching means for switching said piezoelectric crystal between said crystal drive means and said first and second comparators depending upon the mode of operation then desired.

53. A method for analyzing operation of an ink jet head from which ink is ejected due to pressure within said head, said method comprising:

- sensing the pressure characteristic in an ink jet head during a predetermined pressure change period; and
- determining pressure build-up within said ink jet head to thereby detect faults in performance of said ink jet head based upon said sensed pressure characteristic.

54. The method of claim 53 including providing an electrical output signal proportional to said sensed pressure characteristic and utilizing said electrical output signal to detect said faults in the performance of said ink jet head.

55. The method of claim 53 including sensing indication of start-up, sensing of pressure build-up in said ink jet head to a predetermined pressure level, and detecting therefrom said faults in performance of said ink jet head.

56. The method of claim 55 including providing a count between initiation of start-up and pressure build-up in said ink jet head to a predetermined pressure level to determine the time lapse therebetween.

57. The method of claim 56 including comparing said pressure in said ink jet head with a predetermined pressure level and utilizing the result thereof to determine said count.

58. The method of claim 53 including also determining the time lapse between said predetermined pressure level and a second predetermined pressure level in said ink jet head and utilizing the same in conjunction with said time lapse between initiation of start-up and said predetermined pressure level to detect said faults in performance of said ink jet head.

59. The method of claim 53 including utilizing said detected faults to initiate correction of said detected faults.

60. The method of claim 59 including storing said detected faults to facilitate correction of said detected faults.

61. A method for monitoring operation of a device having a material flow initiating unit and a pressure drive for expelling material from said device, said method comprising:

- sensing initiation of material flow in said device;

utilizing a transducer to vibrate the flow during normal operation and utilizing the same transducer to sense pressure build-up in said device following initiation of material flow; and determining the time lapse between sensed initiation of material flow and pressure build-up as sensed by the transducer for monitoring operation of said device.

62. The method of claim 61 including providing electrical output signals indicative of sensed initiation of material flow and pressure build-up and utilizing said electrical output signals to determine said time lapse.

63. The method of claim 62 including utilizing said electrical output signals to provide a count indicative of said time lapse.

64. The method of claim 61 including sensing pressure build-up at different operational levels and utilizing the same in conjunction with said sensed initiation of material flow to determine said time lapse.

65. The method of claim 61 including utilization of said determined time lapse to initiate correction of faults indicated by said time lapse.

66. A method for analyzing operation of an ink jet head, said method comprising:

sensing initiation of start-up of the ink jet head;

sensing pressure build-up in said ink jet head to a predetermined level; and determining the time lapse between said sensed initiation of start-up and said pressure build-up for analyzing operation said ink jet head.

67. The method of claim 66 wherein a count is commenced upon initiation of start-up, and wherein said count is terminated when said sensed pressure build-up exceeds said predetermined reference level.

68. The method of claim 66 including utilizing said determined time lapse to initiate correction of faults indicated by said time lapse.

69. The method of claim 66 wherein said pressure build-up is sensed at different predetermined levels, and utilizing said sensed pressure build-ups and said sensed initiation of start-up for analyzing operation of said ink jet head.

70. The method of claim 69 wherein a first count is commenced upon sensing of initiation of start-up, wherein said first count is terminated and a second count is commenced when said sensed pressure build-up exceeds one of said predetermined reference levels, and wherein said second count is terminated when said first count exceeds the other of said predetermined reference levels.

71. The method of claim 70 including utilizing said counts to initiate correction procedures if said counts are outside of predetermined limits.

72. The method of claim 71 including utilizing said first count to indicate a defect if said count is outside a predetermined range, and utilizing said second count to correct defects if said count is above a predetermined value.

73. The method of claim 72 wherein the initiation of start-up is sensed by sensing initiation of actuation of a valve connected with said ink jet head, wherein said first count is indicative of the time lapse between initiation of valve actuation and the start of pressure build-up in said ink jet head, and wherein said second count is indicative of the time lapse between the start of pressure build-up and achievement of operational pressure in said ink jet head.

74. The method of claim 66 including storing of determined time lapses indicative of start time and rise time.

75. The method of claim 74 including indicating a need for valve maintainence when said stored start time is outside a predetermined range.

76. The method of claim 75 including storing valve pick number and delay information when a need for valve maintainence is indicated.

77. The method of claim 74 including updating the frequency distribution of stored start times in response to later sensed start times.

78. The method of claim 74 including updating the frequency distribution of stored rise times in response to late sensed rise times.

79. The method of claim 74 including initiation of printing by said ink jet head when the rise time of the pressure build-up in said ink jet head is less than a predetermined value indicative of a maximum permissible rise time.

80. The method of claim 74 including initiation of printing by said ink jet head after a predetermined delay when the rise time of the pressure build-up on said ink jet head is less than a first predetermined value indicative of the maximum permissible rise time and is greater than, or equal to, a second predetermined value indicative of air in the ink in said ink jet head.

* * * * *